United States Patent [19]

Hedley et al.

[11] 4,294,316
[45] Oct. 13, 1981

[54] SOD CUTTING AND STACKING MACHINE

[76] Inventors: Victor H. Hedley, 5050 SW. 70th Ave., Ft. Lauderdale, Fla. 33314; Walter A. Olson, 510 Grapefruit St., (Apt. 4B), Sebring, Fla. 33870

[21] Appl. No.: 143,788

[22] Filed: Apr. 25, 1980

[51] Int. Cl.³ .......................................... A01B 45/04
[52] U.S. Cl. ..................................... 172/20; 414/54; 83/94; 83/236
[58] Field of Search ...................... 172/19, 20; 83/236, 83/94; 414/54

[56] References Cited

U.S. PATENT DOCUMENTS

| | | | |
|---|---|---|---|
| 427,572 | 5/1890 | Hills | 83/236 |
| 3,436,996 | 4/1969 | Toensing | 83/236 X |
| 3,675,793 | 7/1972 | Wetzel | 172/20 X |
| 3,807,505 | 4/1974 | Nunes | 172/20 |
| 3,887,013 | 6/1975 | Helberg | 172/20 |
| 3,978,703 | 9/1976 | Primich et al. | 83/236 X |
| 4,162,709 | 7/1979 | Wilson | 172/20 |

FOREIGN PATENT DOCUMENTS 753965  3/1967  Canada .................................. 414/54

*Primary Examiner*—Paul E. Shapiro
*Attorney, Agent, or Firm*—Oltman and Flynn

[57] ABSTRACT

The present machine peels strips of sod from the ground and conveys them upwardly and rearwardly to power driven horizontal rollers. Cutting knives just ahead of these rollers cut the sod strips transversely into pieces of a predetermined length. At the same time, a horizontal platform is raised below the rollers, and upwardly projecting fingers on this platform pass between the rollers and lift the cut pieces of sod off the rollers. During the up and down movement of the platform the oncoming sod strips are held back on the conveyor. A transfer apparatus moves horizontally between a position overlying the rollers, where it receives the sod pieces after they are lifted off the rollers, and a stacking location at one side of the rollers, where it releases the sod pieces to drop by gravity into neighboring stacks. The timing of such release is varied periodically so that the stacks of sod pieces will overlap laterally at intervals.

21 Claims, 20 Drawing Figures

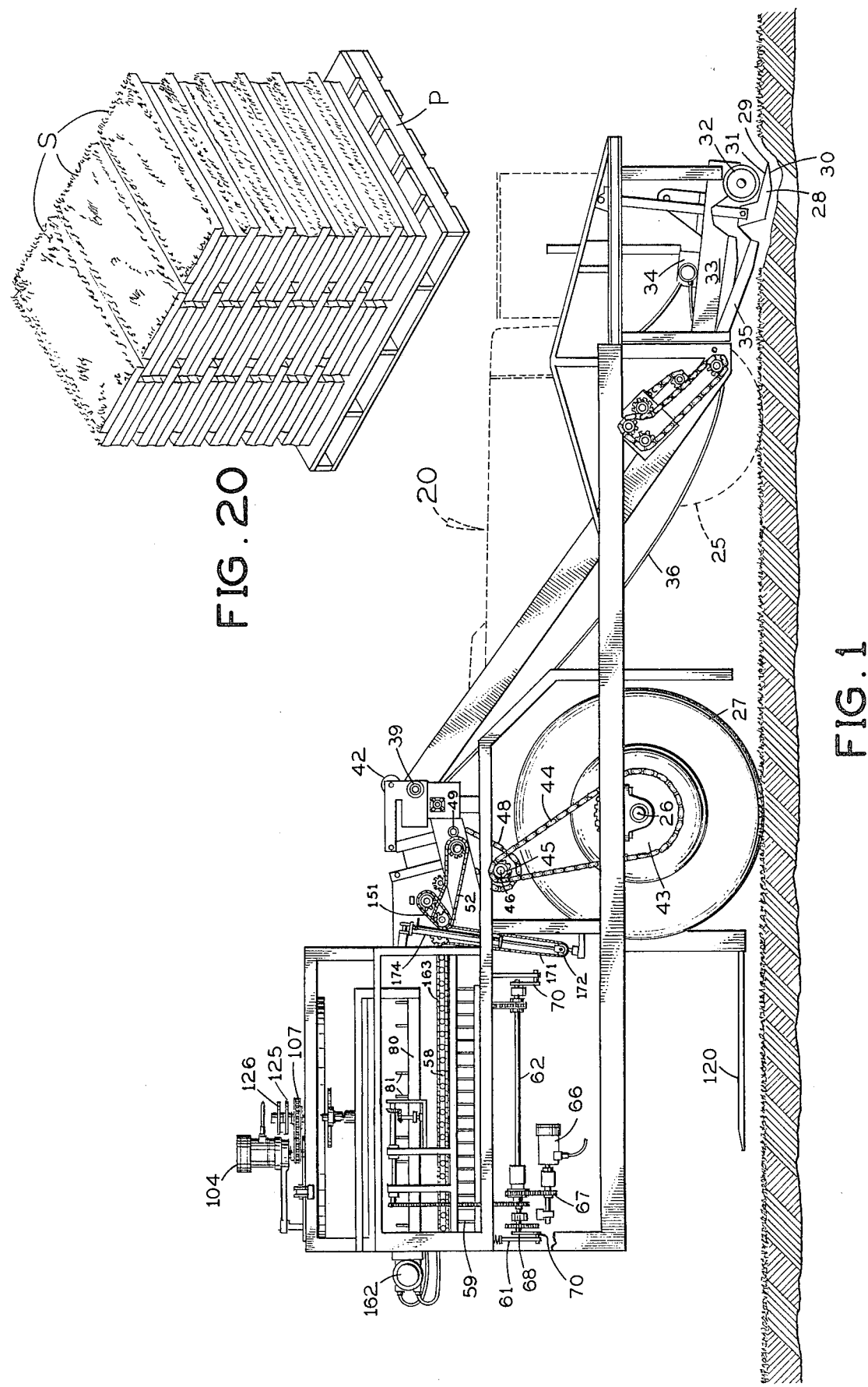

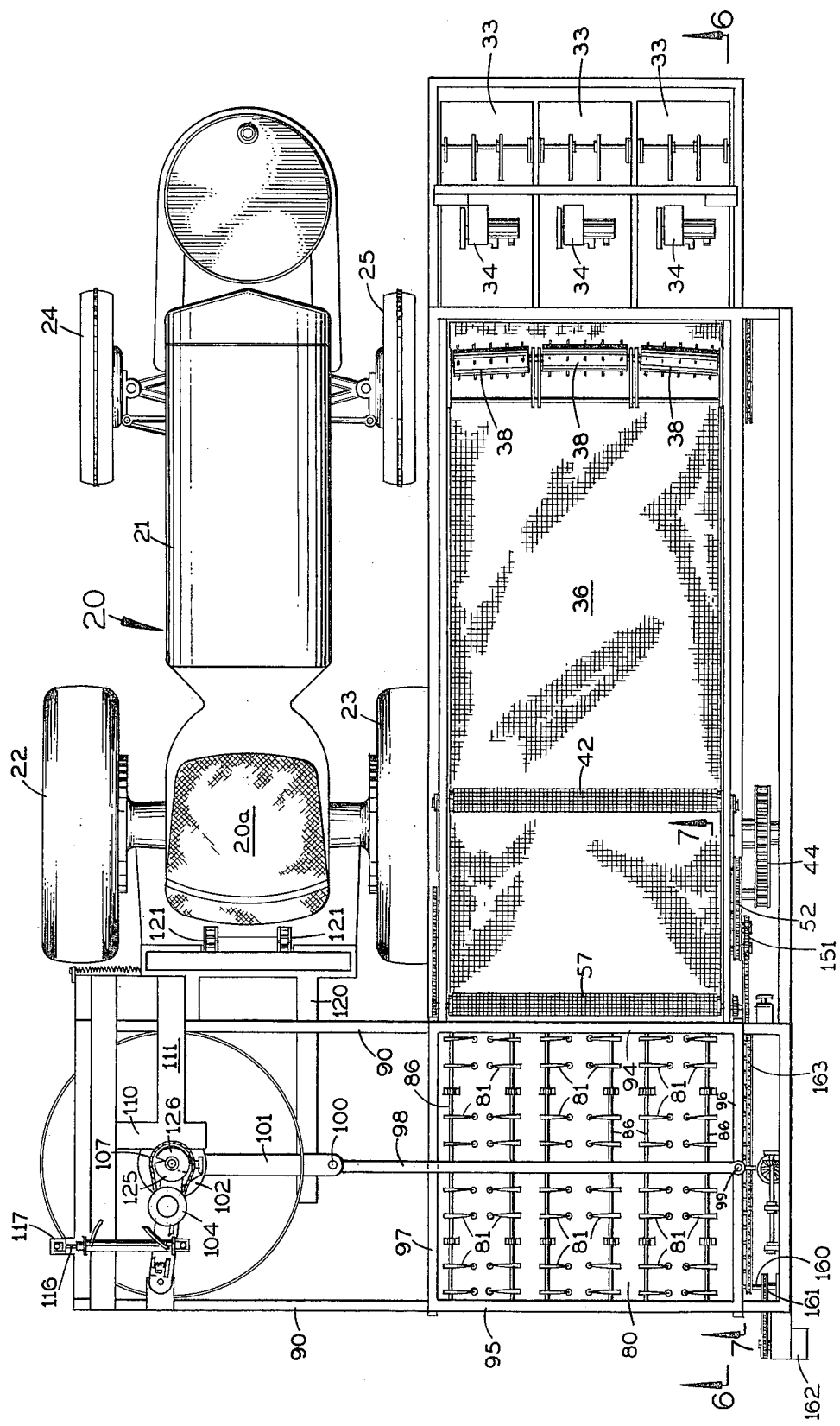

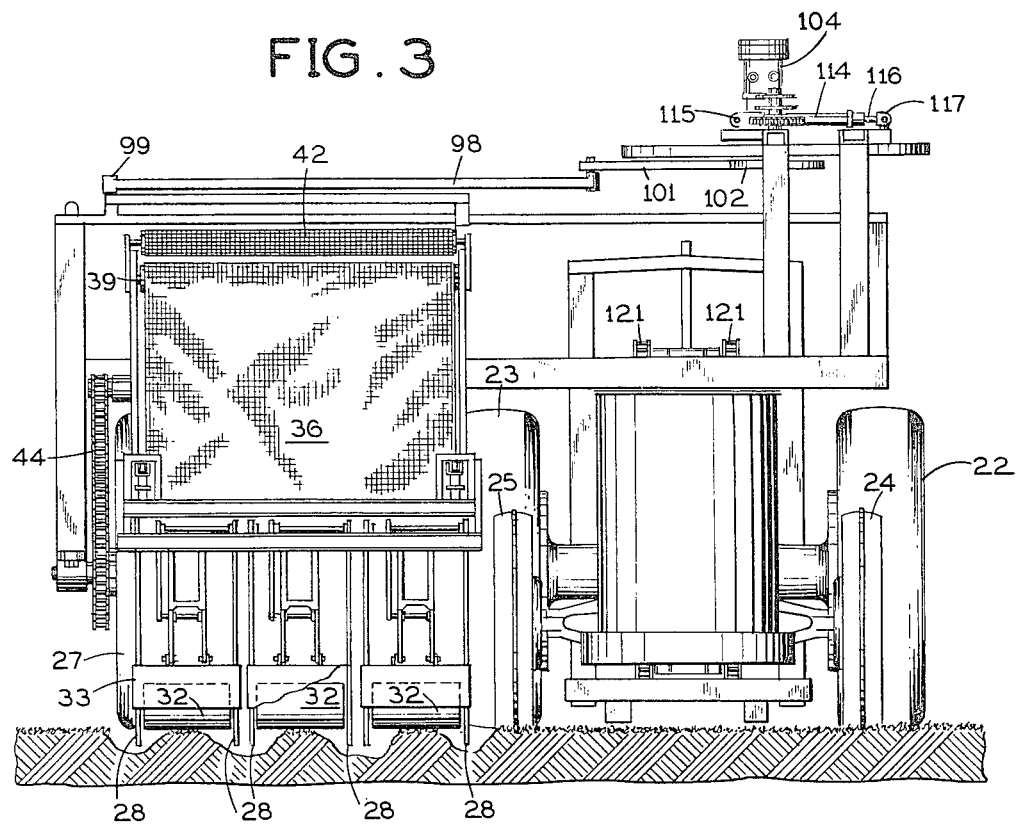
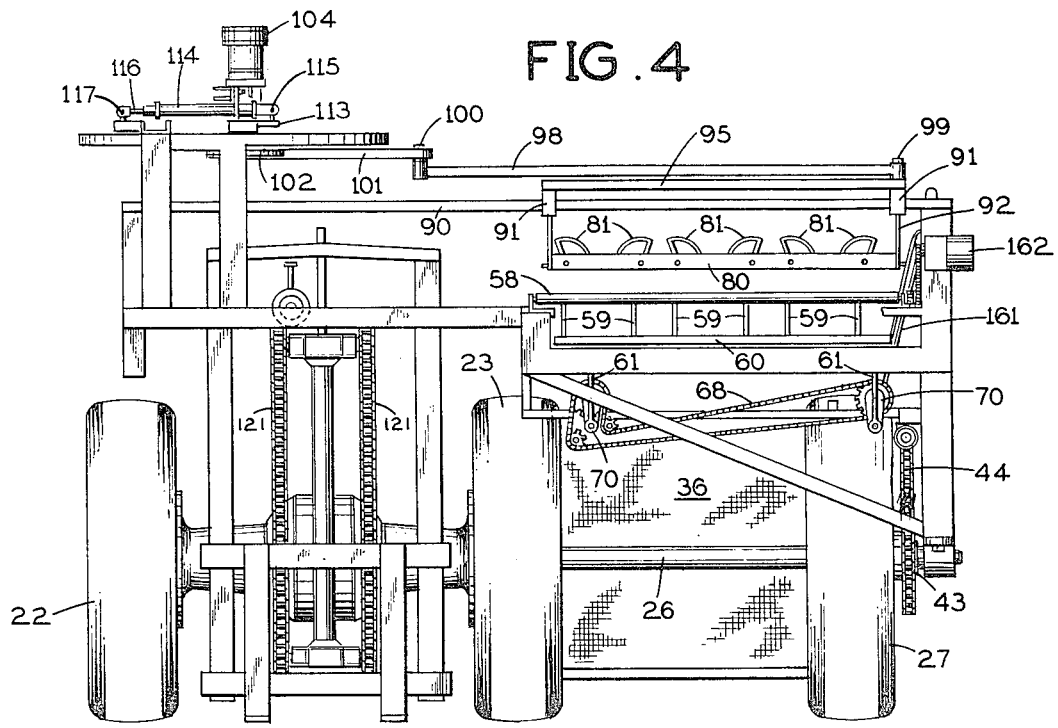

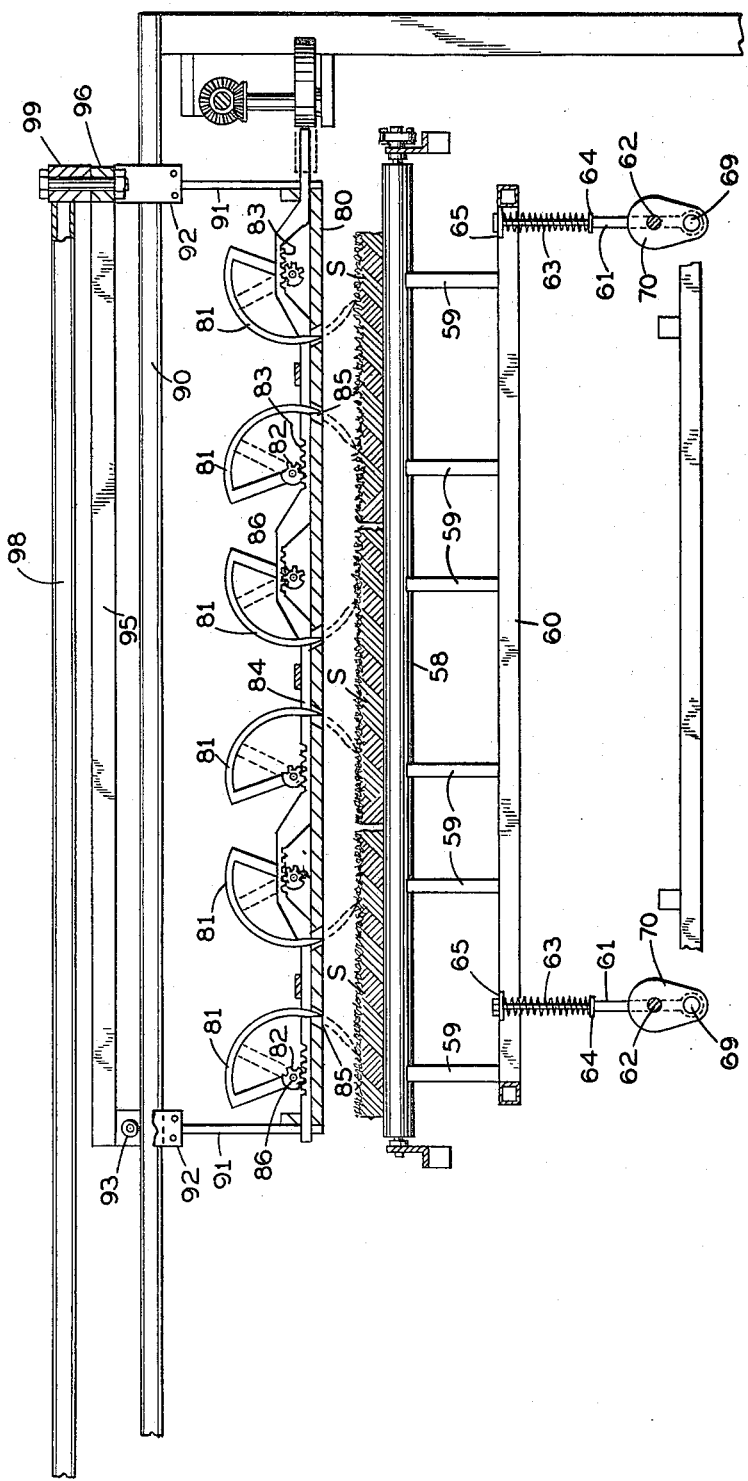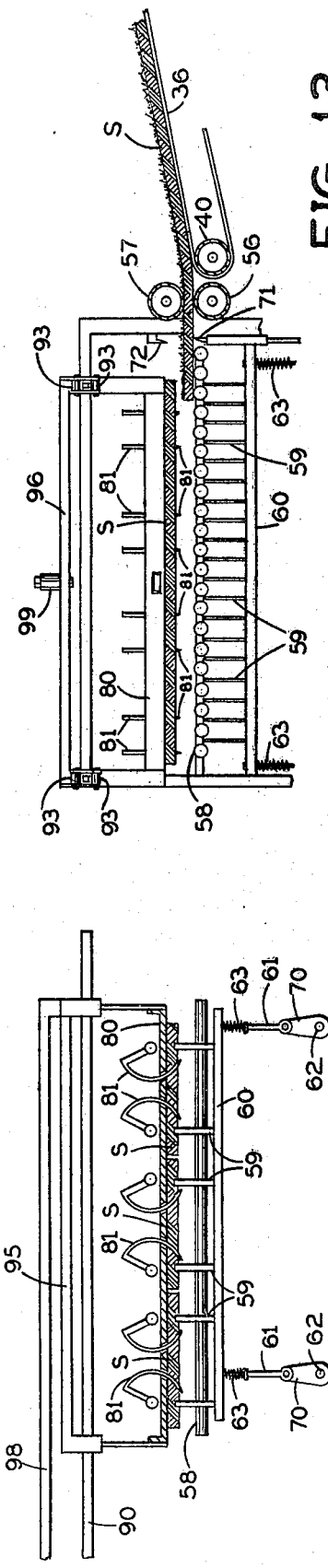

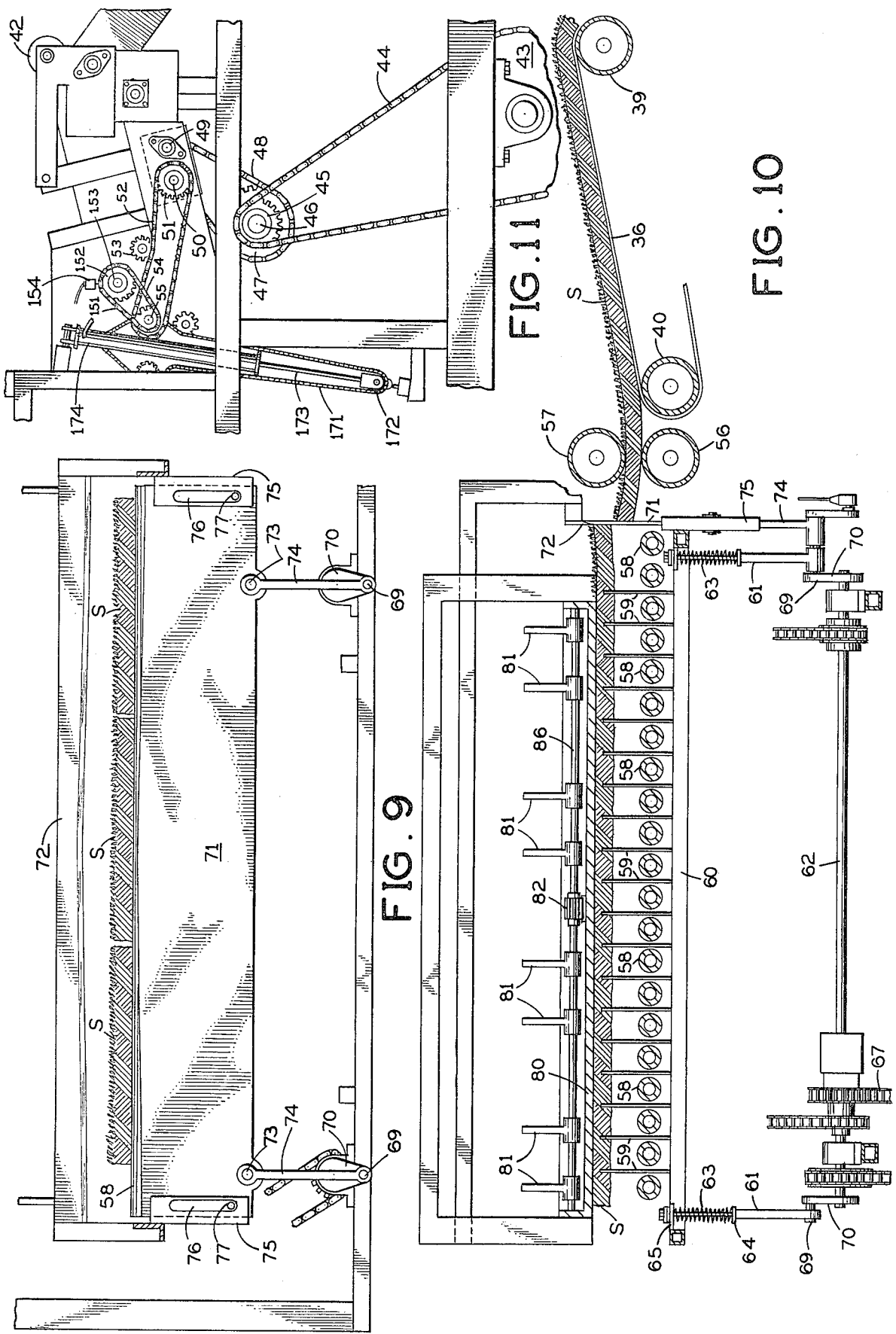

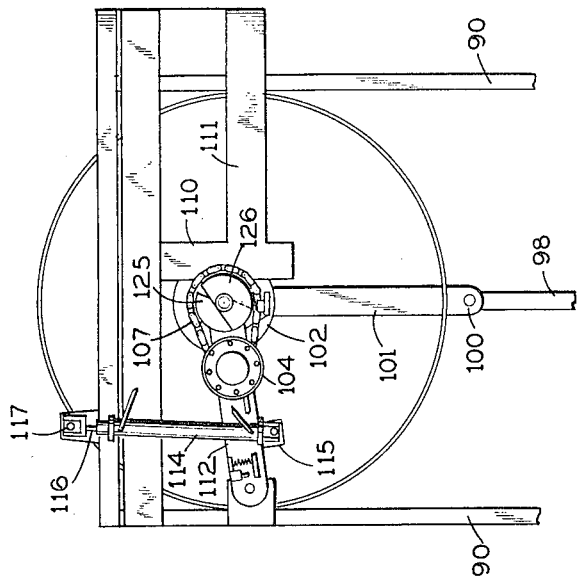
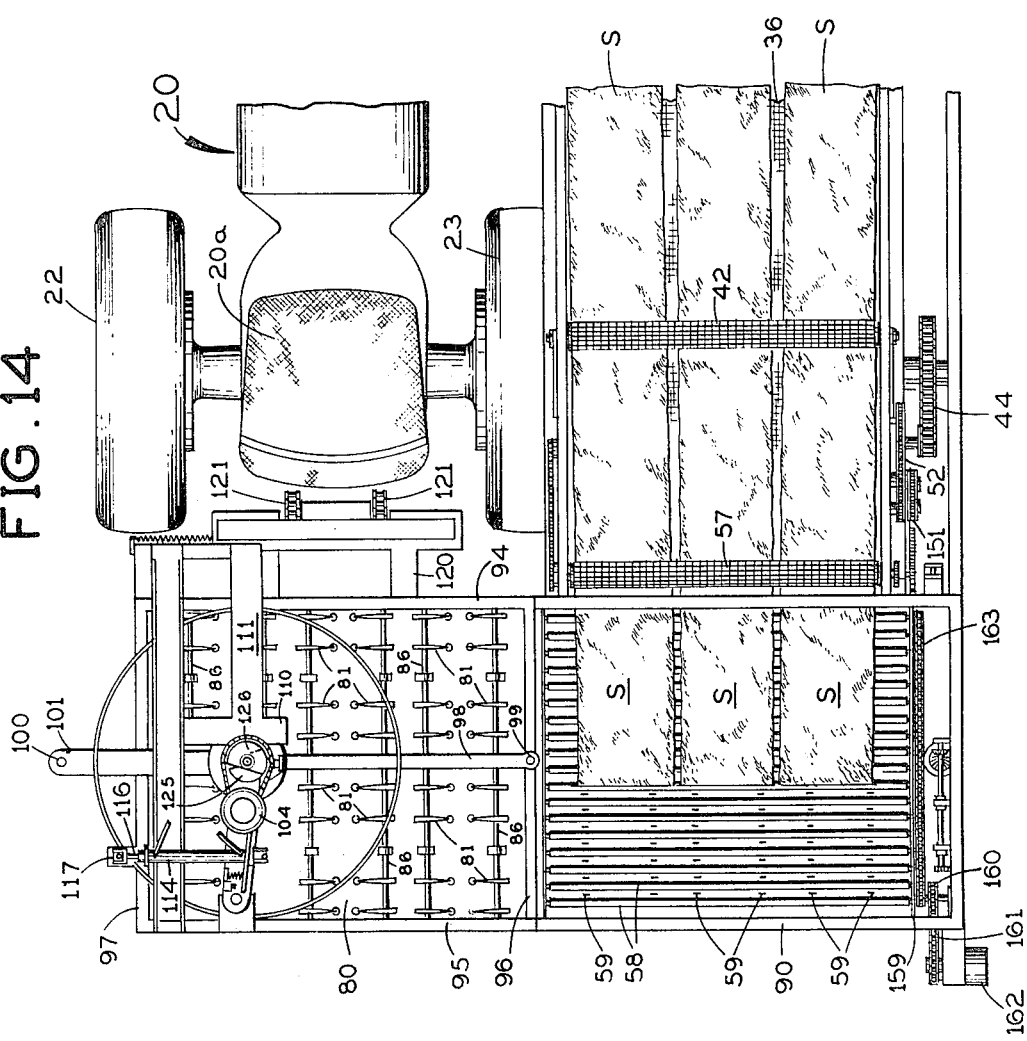

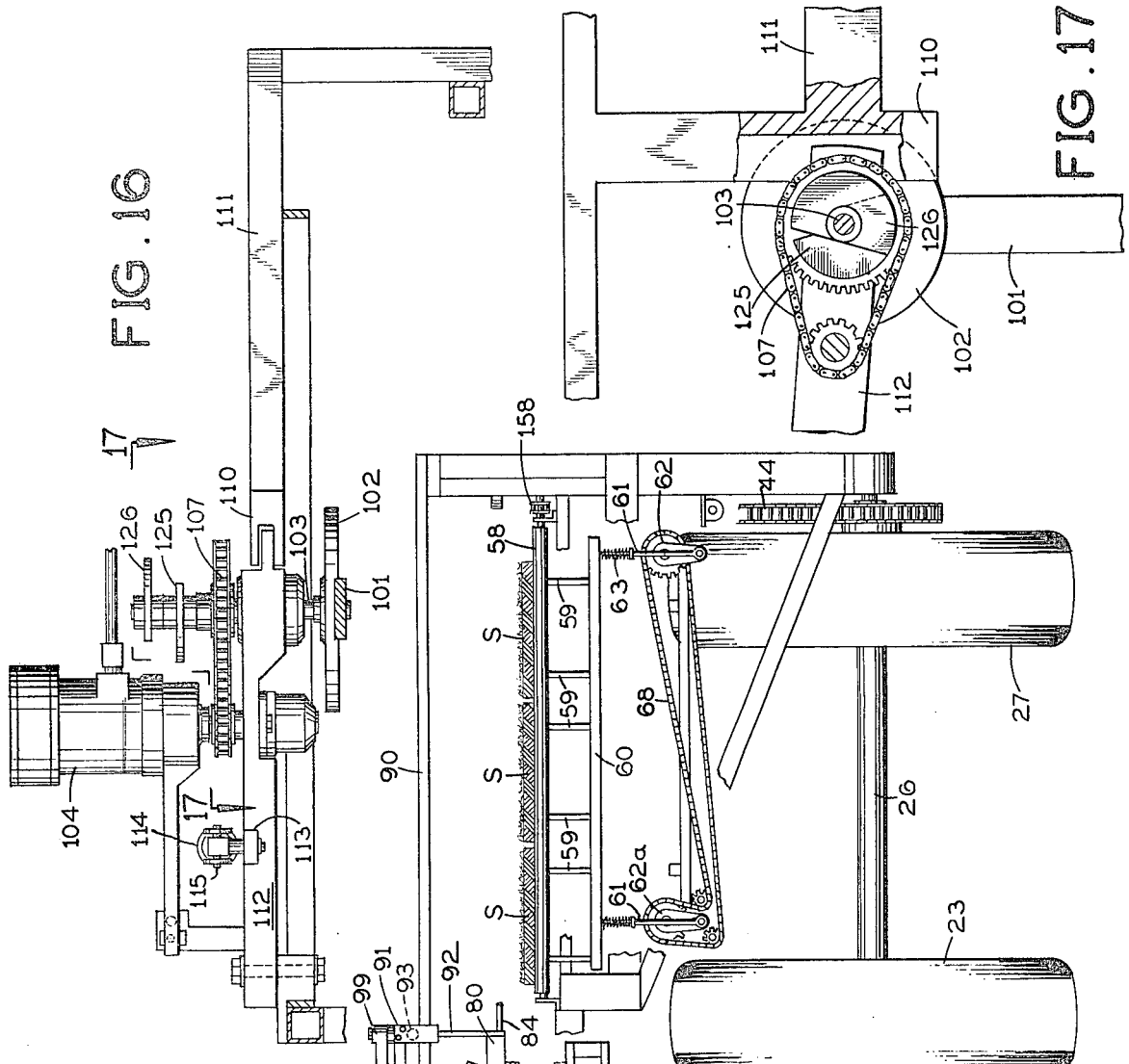
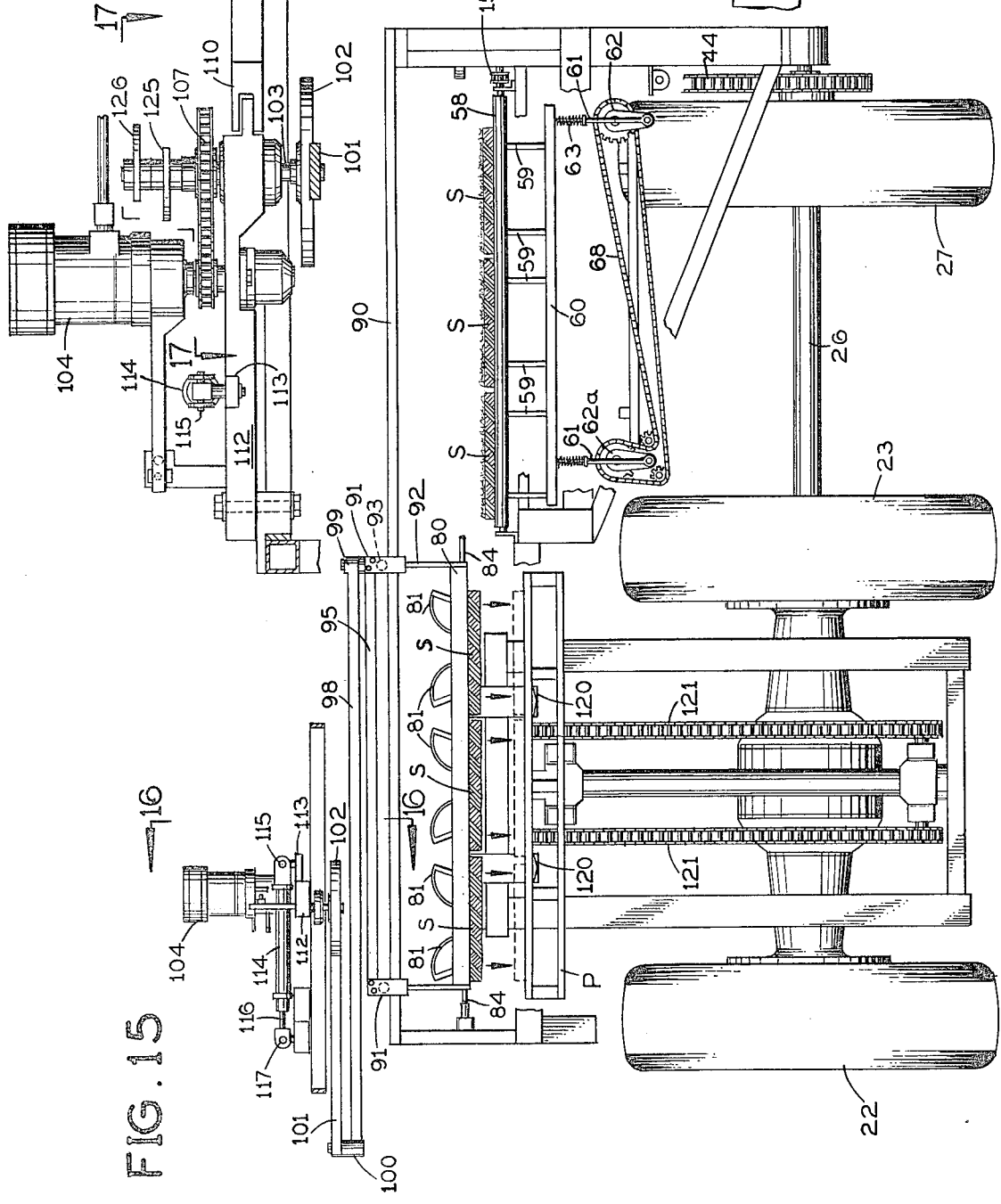

4,294,316

1

SOD CUTTING AND STACKING MACHINE

SUMMARY OF THE INVENTION

This invention relates to a machine for removing sod from the ground in continuous adjacent strips, cutting the strips into pieces of a predetermined length and arranging the pieces of sod in adjoining stacks.

A machine of this general type is disclosed in U.S. Pat. No. 3,887,013 to Helberg. In that machine continuous strips of sod are peeled from the ground and are elevated by upwardly and rearwardly inclined conveyor to a horizontal conveyor. At the entry side of the horizontal conveyor the strips of sod are severed transversely into pieces of a predetermined length. A transfer device picks up the pieces of sod from the horizontal conveyor and carries them to a stacking location at one side of the conveyor. The transfer device is rotated horizontally back and forth a quarter-turn each time it operates so that every piece of sod in each stack will be turned a quarter-turn from the piece immediately below. This criss-cross stacking is for the purpose of enhancing the stability of stacks, so that they are not as likely to tip over, particularly while in transit.

The present invention is directed to a machine of the same general type which has a novel mechanism for stacking the sod pieces all with the same orientation in side-by-side stacks and with a lateral overlap between them at predetermined intervals to enhance their stability without the complexities of criss-cross stacking.

Another important feature of the present machine is its novel transfer mechanism for moving the pieces of sod from a position behind the cutting mechanism laterally to a position where they are to be stacked.

Another important feature of this invention is its novel arrangement for holding back the strips of sod on the conveyor just ahead of the cutting mechanism while the cutting operation is taking place.

A principal object of this invention is to provide a novel and improved machine for peeling strips of sod from the ground, cutting them into pieces, and stacking the pieces in adjoining stacks which are interlocked laterally at intervals to enhance their stability against tipping over.

Further objects and advantages of this invention will be apparent from the following detailed description of a presently-preferred embodiment thereof, which is shown in the accompanying drawings.

DESCRIPTION OF THE DRAWINGS

FIG. 1 is a right side elevational view of the present machine;

FIG. 2 is a top plan view;

FIG. 3 is a front elevation, with certain parts broken away from clarity;

FIG. 4 is a rear elevation;

FIG. 8 is a fragmentary vertical cross-section taken along the line 8—8 in FIG. 7;

FIG. 9 is a fragmentary vertical cross-section taken along the line 9—9 in FIG. 7;

FIG. 10 is a view similar to FIG. 7 but with the operating parts in a different position;

FIG. 11 is a fragmentary right side elevational view showing part of the drive mechanism in the machine;

FIG. 12 is a fragmentary vertical cross-section showing the transfer mechanism gripping the pieces of sod which are raised up against it;

FIG. 13 is a fragmentary right side elevational view of the transfer mechanism after the sod-raising platform is lowered;

FIG. 14 is a top plan view of the machine after pieces have been cut from the strips of sod but before these pieces have been transferred to the stacking position:

FIG. 15 is a rear elevation of the machine when the transfer mechanism is at the stacking position;

FIG. 16 is a fragmentary vertical longitudinal section taken along the line 16—16 in FIG. 15;

FIG. 17 is a fragmentary horizontal cross-section taken along the line 17—17 in FIG. 16;

FIG. 18 is a fragmentary top plan view showing the positions of the parts of drive for the transfer mechanism at a different time during the cycle of operation than as shown in FIG. 14;

FIG. 19 shows a brake mechanism; and

FIG. 20 shows sod pieces stacked in laterally overlapping stacks by the present machine.

DETAILED DESCRIPTION

Figure 5:
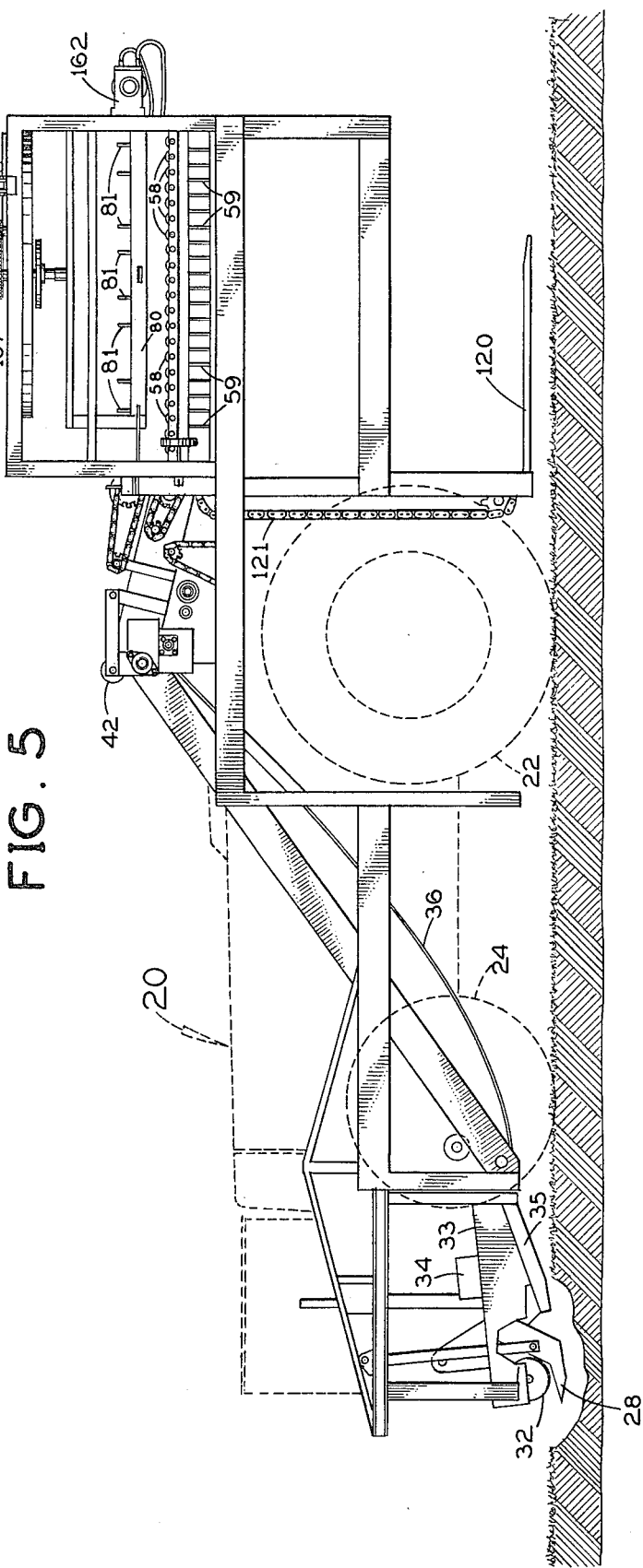
FIG. 5 is a left side elevation with certain parts omitted for clarity and other parts shown in phantom.

Referring to FIG. 2, the present sod cutter is shown mounted at the right side of a tractor 20 having an engine 21 driving a pair of rear wheels 22, 23, and having a pair of front wheels 24 and 25 for steering. As shown in FIG. 4, an axle 26 connects the right rear wheel 23 of the tractor to a similar ground wheel 27 for supporting the present sod cutter.

The sod cutter has vibrating cutters of known design at its front end for peeling sod from the ground as the tractor 20 moves forward across the ground. In the particular embodiment shown, there are three vibrating cutters each having a generally horizontal, laterally extending blade 28 (FIG. 1) with a relatively sharp cutting edge 29 at the front. This cutting edge is at the intersection of a substantially horizontal, flat bottom face 30 of the blade and a flat upwardly and rearwardly inclined top face 31. A respective ground-engaging roller 32 is located a short distance above each blade. Each roller is mounted in a respective housing 33 on which is mounted corresponding hydraulic motor 34. The blade is adjustable to give proper thickness. Each motor 34 is operatively coupled to the corresponding blade 28 to vibrate the latter forward and rearward. Preferably, a space of one inch or so is provided between neighboring blades 28 at the front of the machine, so that narrow uncut strips of sod will remain in the ground for re-growth purposes.

Figure 6:
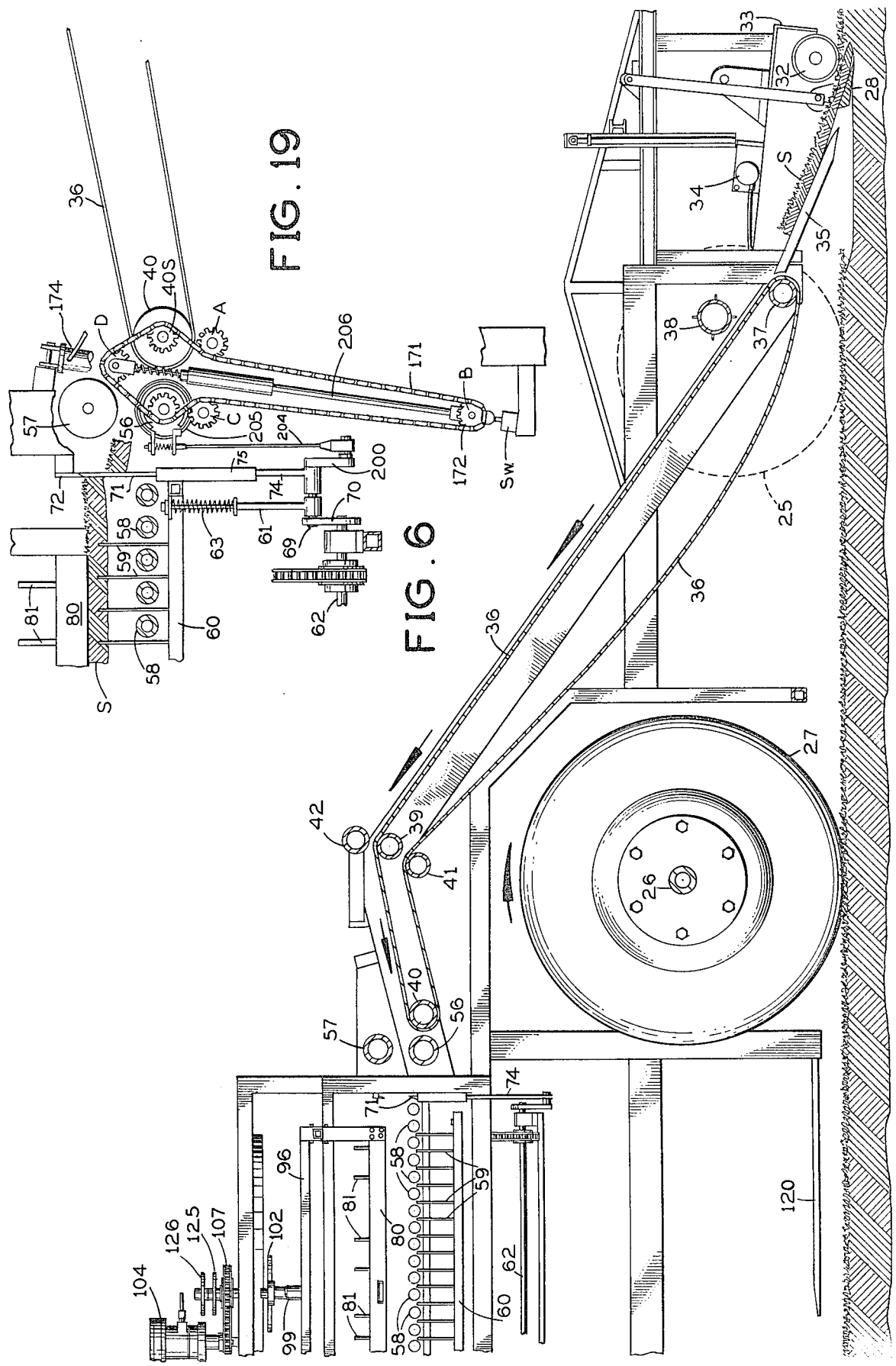
FIG. 6 is a longitudinal vertical section taken along the line 6—6 in FIG. 2.

Behind each blade 28 the sod cutter presents a corresponding upwardly and rearwardly inclined ramp 35 along which the sod S slides after passing up over the blade 28, as shown in FIG. 6. Above the ramp 35 is an inverted roller or conveyor 38 with spikes that pierce sod strip from the top and guide it upward and rearward one for each strip. The inverted conveyors or rollers are mounted at an angle horizontally to pull left and right side sod strips toward center to close gap between strips caused by the uncut strip left in the field for regrowth.

A flexible endless conveyor belt 36 (FIG. 6) carries the sod up from each ramp 35. As shown in FIG. 3, this conveyor extends behind all three vibrating cutters.

The conveyor belt 36 passes up across the front of a lower, horizontal idler roller 37 (FIG. 6) which is located closely behind the upper end of each ramp 35. From the front roller 37 the conveyor belt 36 extends through its upper run or course of movement upward and rearward at an angle of about 45 degrees to the ground. At its upper end the conveyor belt passes rearward over a horizontal top roller 39, and then rearward and downward at a slight angle to a rear roller 40, which is the drive roller in the conveyor. The conveyor belt passes down around the roller 40 and forward beneath it to a roller 41 which is located below and slightly behind the top roller 39. The conveyor belt passes across the top of roller 41 and then forward and downward in its return course of movement to the front roller 37. A pivotally supported roller 42 overlies the conveyor belt 36 above the top roller 39 to hold the three strips of sod S on the conveyor belt as it passes over the top roller 39.

The rear roller 40 is driven from the ground wheel 27 through a chain and sprocket drive, so that the conveyor belt 36 is moving only when the tractor is moving. This drive includes a sprocket 43 (FIG. 1) mounted on the wheel axle 26 and a chain 44 extending up from sprocket 43 to a smaller sprocket 45 mounted on a horizontal shaft 46 (FIG. 11). Also mounted on this shaft is a sprocket 47 which drives a chain 48 that extends up around a sprocket which is hidden in FIG. 11. This sprocket is mounted on a horizontal shaft 49 which drives a shaft 50 behind it through gearing (not shown). Shaft 50 carries a sprocket 51 driving a chain 52 which extends beneath an idler sprocket 53 to a sprocket 54 on a shaft 55 to which the conveyor roller 40 is attached.

Shaft 55 also carries a small gear 150 driving a chain 151, which drives a gear 152 on a horizontal shaft 153 located above and in front of shaft 55. Shaft 153 carries a cam (not shown in FIG. 11) which operates a snap-acting switch 154 to initiate various operations of the machine in timed relation with the advance of the conveyor belt 36.

Immediately behind the rear conveyor roller 40 is a lower idler 56 (FIG. 6), and directly above the lower idler roller 56 is an upper roller 57 carried by a horizontally pivoted holder. The sod moves off the conveyor belt 36 at the rear conveyor roller 40 and passes rearwardly between the rollers 56 and 57 onto a horizontal collector provided by a plurality of horizontal laterally extending collector rollers 58 which are arranged in close succession from front to back. The roller 58 are fixedly positioned vertically.

Each collector roller 58 is on a rotary horizontal shaft extending transversely of the machine and carrying a sprocket 158 (FIG. 15) at its right end. The shaft 159 (FIG. 14) for the rearmost roller 58 carries another sprocket 160 driven by a chain 161. This chain is driven from a hydraulic motor 162 (FIGS. 1 and 14) mounted on the back end of the frame of the machine at the right side. A chain 163 meshes with all of the sprockets 158, so that all of the collector rollers are driven from motor 162.

Figure 7:
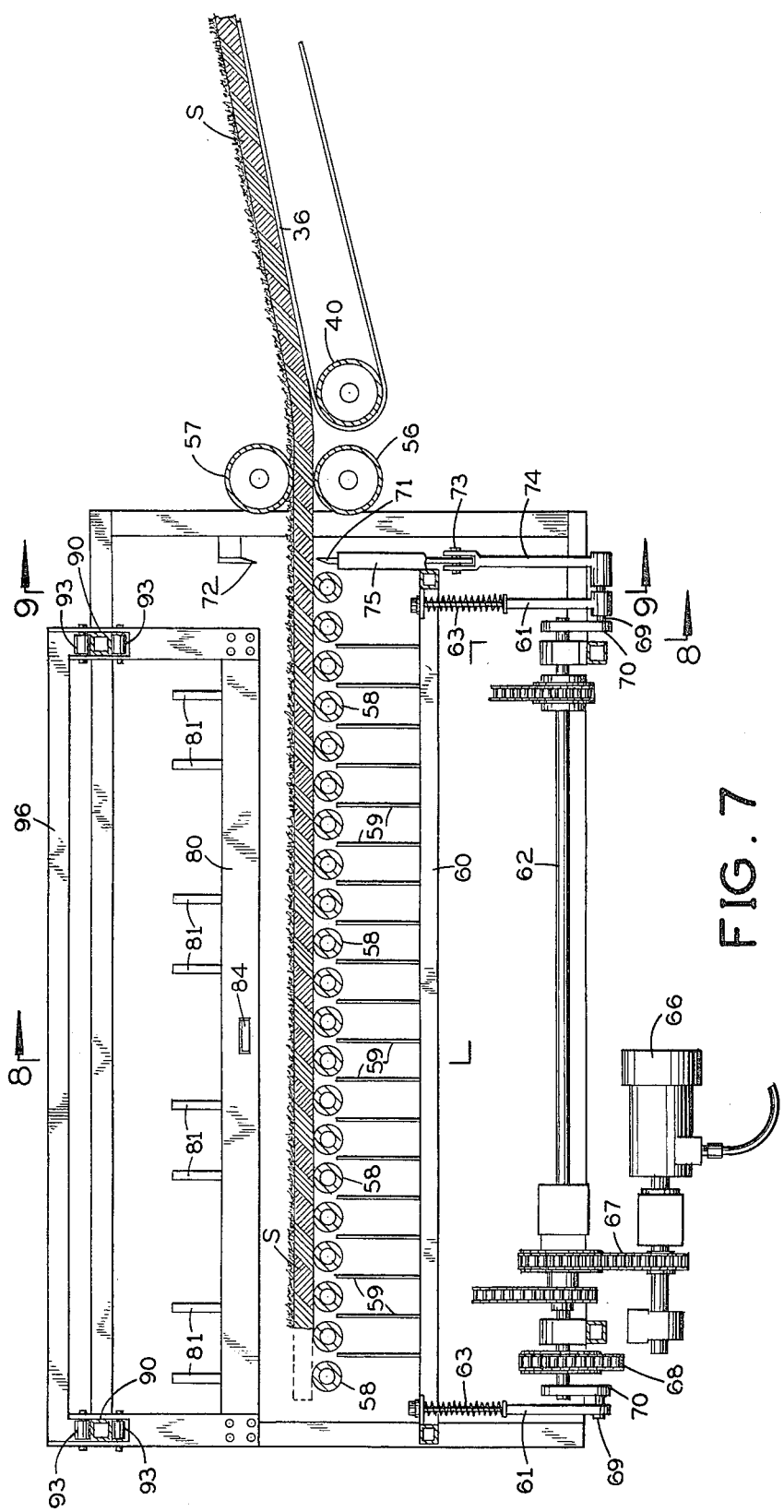
FIG. 7 is a longitudinal vertical section taken along the line 7—7 in FIG. 2.

A plurality of vertical fingers 59 extend up from a horizontal platform 60, which is displaceable vertically below the collector rollers 58. A round rod is welded to the top of each vertical finger making a lift bar between neighboring pairs of collector rollers 58. Normally, as shown in FIG. 7, the top edges of the vertical fingers 59 are below the top of the collector rollers 58. When the platform 60 is raised (FIGS. 19 and 10), the vertical fingers 59 pass up between the collector rollers 58 and lift the sod S off these rollers. As shown in FIG. 12, the vertical fingers 59 are arranged in pairs laterally of the machine beneath each of the three strips of sod S, so that between each neighboring pair of collector rollers 58 there are six fingers 59 projecting up from the vertically displaceable horizontal platform 60.

The platform 60 is mechanically coupled to connecting rods 61 (FIGS. 19 and 10) which move up and down in response to the rotation of corresponding horizontal shafts 62 which extend longitudinally of the machine. There are four such connecting rods 61 located near the four corners of platform 60. The coupling between platform 60 and each connecting rod 61 is resiliently yieldable. As shown in FIGS. 8 and 10 a coil spring 63 is engaged under compression between an annular collar 64 on each connecting rod 61 and a horizontal projection 65 on the platform 60. Normally, the platform 60 moves up and down with the connecting rods 61 but the springs 63 permit the connecting rods to overtravel upwardly with respect to the platform 60.

Referring to FIG. 1, the shaft 62 at the right side of the machine is driven from a hydraulic motor 66 through a chain and sprocket drive 67. This hydraulic motor is controlled by a solenoid valve (not shown) in a known manner. This shaft is coupled to the shaft 62 at the inboard side of platform 60 through a chain 68 (FIGS. 1 and 4) at the rear end of the machine and sprockets on the respective shafts, so that the two shafts 62 rotate in unison and all four connecting rods 61 move up and down simultaneously.

As shown in FIGS. 19, 8 and 10, the lower end of each connecting rod 61 is pivotally coupled at 69 to an eccentric crank 70 on shaft 62.

At the front end of the platform 60 an upwardly projecting lower knife 71 (FIGS. 7 and 19) moves up and down in unison with the platform. This knife has a cutting edge at the top which cooperates with the cutting edge on the bottom of a fixed upper knife 72, which is mounted on the frame of the machine a short distance behind the top roller 57. When the lower knife moves up, as shown in FIG. 10, the oncoming three strips of sod are vertically severed transverse to the direction in which they are moving from the conveyor belt 36 onto the collection rollers 58.

At each end laterally of the machine, the lower knife 71 is pivotally connected at 73 (FIG. 9) to the upper end of a connecting rod 74, which has its lower end povotally connected at 69 to the eccentric crank 70 on the front end of the corresponding shaft 62, as shown in FIG. 7. At each end the lower knife 71 is slidably received in a vertical guide channel 75, which is fixedly mounted on the frame of the machine. Vertically elongated slots 76 (FIG. 9) in the opposite legs of this channel slidably receive a cross pin 77 on the knife 71 to guide the latter vertically.

The solenoid valve for the hydraulic motor 66, which raises and lowers the platform 60 and the lower knife 71, is opened and closed in timed relation with the advance of the sod strips by the conveyor belt 36 onto the collecting rollers 58, so that a predetermined length of the sod strips is cut off and railed each time this motor is operated. The previously mentioned cam-operated switch 154 (FIG. 11) energizes a relay in the circuit which in turn energizes solenoid of this valve which keeps the valve open until the circuit is broken by a switch actuated by the shaft 62 in one complete turn.

The roller 56 is rigidly mounted to frame. Roller 57 is pivot mounted to allow for different sod thickness. Roller 57 is driven by roller 56 through sprocket and chains arranged to give reversed movement to roller 57. Roller 56 is driven by roller 40 through endless chain 58 over idler sprockets A-B-C over roller 56 sprocket upward over idler back to drive sprocket 40S. To stop the flow of sod during cutoff operation Cam 200 on sod lift shaft 62 applies brake 205 through cable 204 stopping roller 56 and 57 causing roller sprocket 405S to pull chain over idler sprockets A-B-C lifing shaft 206 upward. Cylinder 174 being connected to axle of idler sprockets on lift shaft 206 and top of cylinder mounted to frame causes cylinder to retract shaft 62 which operates cutoff cycle, releases the brake and energizes hydraulic solinoid actuating cylinder 174 causing roller 56 to speed up taking up slack sod. A switch (SW) is activated at bottom of stroke breaking circuit to solinoid stopping cycle. In one practical embodiment, this braking action on the sod takes place during the time it would take the conveyor belt 36 to advance the sod by six inches, so six inches of sod bunch up behind the rollers 56, 57 during each up and down movement of platform 60.

Referring to FIGS. 8 and 12, when the platform 60 is raised, the three severed strips of sod are pushed up by the fingers 59 against the bottom of an apertured transfer plate 80. A plurality of arcuate tines or fingers 81 are rotatably mounted above this plate. As shown in FIG. 8, the tines are arranged transversely of the machines in pairs, one pair for each of the severed pieces of sod S. As shown in FIG. 10, longitudinally of the machine the tines 81 are arranged in series of eight each. Thus, the machine has forty-eight tines in all, sixteen for each piece of sod being transferred.

Referring to FIG. 8, six laterally spaced, horizontal, rotatable shafts 86 extend longitudinally of the machine. These shafts are located at the center of the arc of corresponding tines 81 and each of these shafts carries eight similar tines which are spaced apart longitudinally of the machine, as shown in FIG. 10. Each shaft 86 carries a concentric gear 82 which meshes with corresponding teeth 83 on a rack 84, which is slidable across the top of the transfer plate transversely of the machine.

Each tine 81 presents a pointed lower free end which is received in a corresponding opening 85 in the transfer plate 80. The tines are in the raised position shown in full lines in FIG. 8 when the severed pieces of sod are first raised against the plate 80. The tines 81 move down through the plate openings 85 to the phantom line positions in this Figure. The tines bite into the sod and hold it against the transfer plate 80 when the platform 60 and fingers 59 move back down.

From FIG. 8 it will be evident that the tines 81 are arranged laterally of the machine in pairs for each piece of sod, with the tines of each pair having an opposite curvature and rotating in opposite directions so that their pointed lower ends move away from each other as they move down into the pieces of sod. That is, the pointed lower end of each tine 81 moves from a starting position above and near the middle of the piece of sod to a position below and toward a longitudinal edge of the piece of sod, so as to hold it substantially flat against the bottom of the transfer plate 80. As shown in FIG. 8, the tine of each pair which rotates clockwise from the raised position down to its sod-holding position is attached to a gear 82 which meshes with upwardly-facing teeth 83 on the rack 84. The other tine of the same pair, which rotates counterclockwise from the raised position down to its sod-holding position, is attached to a gear 82 which meshes with downwardly-facing teeth 83 on the rack 84.

Referring to FIG. 15, the transfer plate 80 is horizontally reciprocable laterally of the machine between a position overlying the collector rollers 58 at the right side of the tractor and the position shown in this Figure in which it is directly behind the driver's seat 20a of the tractor. The frame of the machine has a pair of laterally extending horizontal guide rails 90 which support slides 91 from which the transfer plate 80 is suspended by posts 92, one at each corner of the transfer plate 80. The slides 91 have anti-friction rollers 93 which slidably engage the top and bottom of the respective guide rails 90, as shown in FIG. 7. The four slides 91 are attached to the bottom of a horizontal rectangular frame which, as shown in FIG. 14, has front and back members 94 and 95, which extend laterally of the machine, and right and left side members 96 and 97, which extend longitudinally of the machine.

For moving the transfer plate 80 back and forth laterally of the machine, a horizontal actuator arm 98 (FIG. 8) has its right and pivotally connected at 99 to the frame member 96 midway along the latter's length, as shown in FIG. 14. The left end of the actuator arm 9B is pivotally connected at 100 (FIG. 15) to an arm 101 which extends radially from a rotatable horizontal disc 102. A shown in FIG. 16, the disc 102 is on the lower end of a vertical shaft 103 which is driven from a hydraulic motor 104 through a sprocket 105 on the motor shaft 106 (FIG. 17). A chain 107 driven by sprocket 105, and a sprocket 108 on the disc shaft 103.

The disc shaft 103 is rotatably supported in a horizontal plate 109 which is fixedly supported by the frame of the machine. As shown in FIGS. 16 and 17, the plate 109 is welded to a horizontal bar 110 in the machine frame which extends laterally inward from the left side of this frame. The lateral bar 110 is reinforced by a longitudinal bar 111 of the machine frame.

The motor shaft 106 is rotatably mounted in a horizontal inverted channel bar 112 (FIGS. 15 and 16) which overlies the plate 109 and is angularly adjustable in a horizontal plans about the disc shaft 103. A horizontal plate 113 (FIG. 15) is affixed to the channel 112 and extends perpendicular to it. An hydraulic cylinder 114 is horizontally pivoted on plate 113 at 115. A piston (not shown) in this cylinder is connected to a piston rod 116 whose outer end is pivotally connected at 117 to part of the frame of the machine. A coil spring 118 (FIGS. 2 and 14) is engaged under compression between the outer end of the channel 112 and a plate 119 fixed to the machine frame. This spring biases the channel 112 pivotally about the disc shaft 103 clockwise from the position shown in FIGS. 2 and 14 to the position shown in FIG. 18, in which the length of the piston rod 116 outside the cylinder 114 is a minimum. When pressurized air is introduced into the cylinder 114, the cylinder 114 moves away from the outer end of the piston rod 116, causing the channel 112 to pivot counterclockwise from the position shown in FIG. 18 to the position shown in FIGS. 2 and 14. Thus, the motor 104 revolves through a limited arc about the disc shaft 103 as an axis.

Behind the driver's seat 20a of the tractor a fork lift 120 (FIGS. 5 and 14) is arranged to be raised and lowered by chains 121 (FIGS. 5 and 15). This form lift is operated to raise a conventional pallet P (FIG. 15) to a starting position closely below the position of the transfer plate 80 when the latter is moved to the left, as described. When the transfer plate reaches this position the tines 81 are raised out of the respective pieces of sod, so that these pieces drop onto the pallet P. This is effected by moving the rack 84 to the position shown in FIG. 8, which is done by the air cylinder-and-piston unit C.

The timing of the operation of this air cylinder, first to move the tines 81 down into the sod pieces when they are at the right side of the machine, and later to raise the tines out of the sod pieces when they are over the fork lift pallet P behind the driver's seat 20a at the left side of the machine, is under the control of two cams 125 and 126 (FIG. 16) on the upper end of the disc shaft 103. These cams operate corresponding snap-acting switches (not shown) which control the operation of this air cylinder in a known manner. One of these switches is actuated when the transfer plate 80 is at the right side of the machine (FIGS. 2 and 4), at which time the tin tines 81 will be pushed down into the pieces of sod to hold them up against plate 80. The other of these switches is actuated when the transfer plate is at the left side of the machine (behind the driver's seat), as shown in FIGS. 14 and 15, at which time the tines 81 will be raised to release the pieces of sod to drop onto the pallet P.

In accordance with the present invention, the raising of the tines 81 to release the pieces of sod is varied periodically so that the three stacks of sod on the pallet will overlap at intervals. For example, as shown in FIG. 20, at every fourth piece the stacks overlap. This is achieved by an earlier release of the sod pieces in every fourth movement of the transfer plate 80 to the left. Consequently, the lateral position of each sod piece involved in this early release is offset to the right of the three preceding pieces in the same stack, producing the overlap between stacks as shown in FIG. 20.

The timing of the release of the sod pieces is determined by the angular position of the motor 104 with respect to the disc shaft 103. Normal release occurs when the air cylinder 114 is in the position shown in FIG. 18 (a position to which it is urged by spring 118). This is the position of air cylinder 114 in three out of four cycles of movement of the transfer plate 80. However, in every fourth such cycle, pressurized air is introduced into the cylinder 114, moving it to the position shown in FIG. 14 for early release of the pieces of sod. Such angular movement of the motor 104 about the disc shaft 103 changes the driving relationship between them (through chain 107) such that the rotational speed of shaft 103 is momentarily increased enough to advance the operation of the cam-operated switch which causes the air cylinder C to raise the tines 81.

A contact switch on shaft 62 closes contacts on relay which energizes a hydraulic solenoid to hydraulic motor 104 and turns shaft with arm 101 and connecting rod 98 pulling transfer plate to unload position. When connecting rod 98 passes the center line of the transfer plate, it contacts a lever which contacts the plunger that releases the spring loaded rack and the tines are released from sod. The transfer plate returns to load position. A contact switch on shaft 103 breaks circuit to solenoid and stops cycle.

Driven by a chain from shaft 62 at a ratio of 4 to 1 is a rotary switch that sends current to switches operated by cams 125 and 126. As shaft 103 turns cam 126 closes the switch and relay and hydraulic solenoid which energizes cylinder 114 pulling bar with motor and shaft assembly rearward. Sod strips drop 4" to rear of original drop.

We claim:

1. In a sod cutting machine having;
   means for peeling parallel strips of sod from the ground simultaneously;
   means providing a horizontal support in the machine;
   means for conveying the strips of sod upward from the ground to said horizontal support means;
   means for cutting the strips of sod transversely into pieces which are deposited on said horizontal support means;
   transfer means for picking the pieces of sod off said horizontal support means and carrying said pieces to a stacking location at one side of said support means;
   and means for actuating said transfer means to release the sod pieces to drop by gravity into respective stacks when said transfer means is at said stacking location;
   the improvement which comprises:
   means for controlling said transfer means to maintain the same orientation of the sod pieces during successive operations of said transfer means;
   and means for periodically varying the timing of the release of sod pieces during different operations of said transfer means to thereby produce a lateral overlap between neighboring stacks of sod pieces.

2. A machine according to claim 1, wherein:
   said horizontal support means comprises a plurality of horizontal rollers extending transversely of the machine and spaced apart longitudinally of the machine;
   and said transfer means includes a vertically reciprocable horizontal platform below said rollers and vertical fingers extending up from said platform between the rollers to engage the sod pieces from below and lift them off the rollers when said platform is raised.

3. A machine according to claim 2, and further comprising drive means for rotating said rollers continuously.

4. A machine according to claim 1, wherein:
   said transfer means comprises a horizontal transfer plate with openings therein, a plurality of curved tines rotatably mounted above said plate and extending down through said openings in one rotational position to pierce the pieces of sod and hold them up against the transfer plate;
   and said means for controlling said transfer means includes horizontal guides extending transversely of the machine and supporting said transfer plate for guided movement between a position overlying said horizontal support means and a position at said stacking location.

5. A machine according to claim 4, wherein:
   said horizontal support means comprises a plurality of horizontal rollers extending transversely of the machine and spaced apart longitudinally of the machine:
   and said transfer means includes a vertically reciprocable horizontal platform below said rollers and vertical fingers extending up from said platform between the rollers to engage the sod pieces from below and lift them off the rollers and up against said transfer plate when said platform is raised.

6. A machine according to claim 5, and further comprises drive means for rotating said rollers continuously.

7. A machine according to claim 1, wherein:
said means for actuating said transfer means comprises a drive motor, a rotary vertical shaft driven by said motor and offset therefrom, means operatively coupling said shaft to said transfer means to move the latter back and forth between said horizontal support and said stacking position in response to rotation of said shaft, and switch means operated by said shaft at a predetermined point during each rotation of said shaft to initiate the release of the sod pieces by said transfer means;
and said means for varying the timing of the release comprises means for periodically revolving said motor angularly about the axis of said shaft while maintaining the driving relationship between them to thereby change the timing of the operation of said switch means with respect to the movement of said transfer means to said stacking location.

8. A machine according to claim 7, wherein:
said horizontal support means comprises a plurality of horizontal rollers extending transversely of the machine and spaced apart longitudinally of the machine;
and said transfer means includes a vertically reciprocable horizontal platform below said rollers and vertical fingers extending up from said platform between the rollers to engage the sod pieces from below and lift them off the rollers when said platform is raised.

9. A machine according to claim 8 and further comprising
drive means for rotating said rollers continuously.

10. A machine according to claim 7, wherein:
said transfer means comprises a horizontal transfer plate with openings therein, plurality of curved tines rotatably mounted about said plate and extending down through said openings in one rotational position to pierce the pieces of sod and hold them up against the transfer plate;
and said means for controlling said transfer means includes horizontal guides extending transversely of the machine and supporting said transfer plate for guided movement between a position at said stacking location.

11. A machine according to claim 10, wherein:
said horizontal support means comprises a plurality of horizontal rollers extending transversely of the machine and spaced apart longitudinally of the machine;
and said transfer means includes a vertically reciprocable horizontal platform below said rollers and vertical fingers extending up from said platform between the rollers to engage the sod pieces from below and lift them off the rollers and up against said transfer plate when said platform is raised.

12. A machine according to claim 11 and further comprising drive means for rotating said rollers continuously.

13. A machine according to claim 1, wherein:
said means for conveying the strips of sod upward from the ground comprises conveyor belt means extending upward and rearward from said means for peeling to said horizontal support means, and drive means for moving said conveyor belt means;
and said means for cutting is located between the rear end of said conveyor belt means and said horizontal support means; and further comprising:
means for holding said strips of sod on said conveyor belt means at the latter's rear end and preventing said strips of sod from continuing to move onto said horizontal support means while said cutting means cuts the sod into pieces.

14. A machine according to claim 13, wherein said holding means releases said strips of sod for movement onto said horizontal support means in timed relationship with the operation of said transfer means.

15. A machine according to claim 14, wherein:
said horizontal support means comprises a plurality of horizontal rollers extending transversely of the machine and spaced apart longitudinally of the machine;
and said transfer means includes a vertically reciprocable horizontal platform below said rollers and vertical fingers extending up from said platform between the rollers to engage the sod pieces from below and lift them off the rollers when said platform is raised.

16. A machine according to claim 15, and further comprising drive means for rotating said rollers continuously.

17. A machine according to claim 14, wherein:
said transfer means comprises a horizontal transfer plate with openings therein, a plurality of curved tines rotatably mounted above said plate and extending down through said openings in one rotational position to pierce the pieces of sod and hold them up against the transfer plate;
and said means for controlling said transfer means includes horizontal guides extending transversely of the machine and supporting said transfer plate for guided movement between a position overlying said horizontal support means and a position at said stacking location.

18. A machine according to claim 17, wherein:
said horizontal support means comprises a plurality of horizontal rollers extending transversely of the machine and spaced apart longitudinally of the machine:
and said transfer means includes a vertically reciprocable horizontal platform below said rollers and vertical fingers extending up from said platform between the rollers to engage the sod pieces from below and lift them off the rollers and up against said transfer plate when said platform is raised.

19. A machine according to claim 18, and further comprises drive means for rotating said rollers continuously.

20. In a sod cutting machine having:
means for peeling parallel strips of sod from the ground simultaneously;
means providing a horizontal support in the machine;
means fior conveying the strips of sod upward from the ground to said horizontal support means;
means for cutting the strips of sod transversely into pieces which are deposited on said horizontal support means;
transfer means for picking the pieces of sod off said horizontal support means and carrying said pieces to a stacking location at one side of said support means;
and means for actuating said transfer means to release the sod pieces to drop by gravity into respective stacks when said transfer means is at said stacking location;
the improvement wherein:

said horizontal support means comprises a pluality of horizontal rollers extending transversely of the machine and spaced apart longitudinally of the machine;

and said transfer means includes a vertically reciprocable horizontal platform below said rollers and vertical fingers extending up from said platform between the rollers to engage the sod pieces from below and lift them off the rollers when said platform is raised.

21. In a sod cutting machine having:

means for peeling parallel strips of sod from the ground simultaneously;

means providing a horizontal support in the machine;

conveyor belt means extending upward and rearward from said peeling means, and driving means for moving said conveyor belt means to convey the strips of sod upward and rearward from the ground;

cutting means located between the rear end of said conveyor belt means and said horizontal support means for cutting the strips of sod transversely into pieces which are deposited on said support means;

transfer means for picking the pieces of sod off said horizontal support means and carrying said pieces to a stacking location at one side of said support means;

and means for actuating said transfer means to release the sod pieces to drop by gravity into respective stacks when said transfer means is at said stacking location;

the improvement which comprises:

means for holding said strips of sod on said conveyor belt means at the latter's rear end and preventing said strips of sod from continuing to move onto said horizontal support means while said cutting means cuts the sod into pieces;

and wherein:

said horizontal support means comprises a plurality of horizontal rollers extending transversely of the machine and spaced apart longitudinally of the machine;

and said transfer means includes a vertically reciprocable horizontal platform below said rollers and vertical fingers extending up from said platform between the rollers to engage the sod pieces from below and lift them off the rollers when said platform is raised, said platform being operatively coupled to said cutting means to cause the latter to cut the strips of sod when the platform is raised.

* * * * *